United States Patent
Ito

(10) Patent No.: US 7,196,861 B2
(45) Date of Patent: Mar. 27, 2007

(54) METHOD OF EVALUATING POSITIONING ACCURACY OF A MAGNETIC HEAD TESTER

(75) Inventor: Fumiyuki Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/711,941

(22) Filed: Oct. 14, 2004

(65) Prior Publication Data

US 2005/0270675 A1    Dec. 8, 2005

(30) Foreign Application Priority Data

Jun. 8, 2004   (JP) .............................. 2004-169979

(51) Int. Cl.
*G11B 27/36*   (2006.01)
(52) U.S. Cl. ........................................ 360/31
(58) Field of Classification Search ...................... None
See application file for complete search history.

(56) References Cited

U.S. PATENT DOCUMENTS

| | | | | |
|---|---|---|---|---|
| 4,007,493 A | * | 2/1977 | Behr et al. ............... | 360/77.07 |
| 5,276,568 A | * | 1/1994 | Murata et al. ................ | 360/70 |
| 5,751,512 A | * | 5/1998 | Anderson ................ | 360/78.04 |
| 5,847,891 A | * | 12/1998 | Ohmori et al. ............... | 360/65 |
| 5,847,907 A | * | 12/1998 | Hashimoto .................. | 360/135 |
| 5,978,165 A | * | 11/1999 | Magnusson ............... | 360/73.04 |
| 6,005,751 A | * | 12/1999 | Kazmierczak et al. ...... | 360/244 |
| 6,078,460 A | * | 6/2000 | Moriya .................... | 360/77.04 |
| 6,650,491 B1 | * | 11/2003 | Suzuki et al. ................. | 360/31 |
| 6,839,193 B1 | * | 1/2005 | Chong et al. ................. | 360/31 |
| 6,873,488 B1 | * | 3/2005 | Teo et al. ................ | 360/77.06 |

FOREIGN PATENT DOCUMENTS

JP             9-288811          11/1997

* cited by examiner

*Primary Examiner*—Wayne Young
*Assistant Examiner*—Glenda P. Rodriguez
(74) *Attorney, Agent, or Firm*—Armstrong, Kratz, Quintos, Hanson & Brooks, LLP

(57) ABSTRACT

A method of evaluating the positioning accuracy of a magnetic head tester can accurately test magnetic heads and so can reliably provide non-defective goods. In a method of evaluating the positioning accuracy of a magnetic head tester that tests the performance of a magnetic head 14 by carrying out writing and reading operations on a magnetic medium 12 using the magnetic head 14. A plurality of GAPS profiles are acquired by repeatedly carrying out a GAPS test that measures a GAP offset amount for the same magnetic head 14 that has been attached to the magnetic head tester, a GAP offset fluctuation amount is calculated from the acquired plurality of GAPS profiles, and the calculation result is set as an index for evaluating the position reproducibility of the magnetic head.

4 Claims, 6 Drawing Sheets

METHOD OF EVALUATING POSITIONING ACCURACY OF A MAGNETIC HEAD TESTER

BACKGROUND OF THE INVENTION

1. Field of the Invention

The present invention relates to a method of evaluating positioning accuracy of a magnetic head tester that tests the performance of a magnetic head mounted in a magnetic disc apparatus.

2. Related Art

During the manufacturing process of magnetic heads, tests that write and read signals onto a magnetic medium using the magnetic heads are actually carried out to investigate the performance of the magnetic heads.

FIG. 1 schematically shows the construction of a magnetic head tester. This magnetic head tester includes a magnetic disc driving mechanism 10 such as a spindle motor, a magnetic medium 12 that is rotationally driven by the magnetic disc driving mechanism 10, and a head attaching mechanism 20 that supports a magnetic head 14 that is the tested product. The head attaching mechanism 20 is constructed so that the magnetic head that is the tested product can be interchanged. The head attaching mechanism 20 is supported by a head driving mechanism 22 that drives the magnetic head 14 in the radial direction and the head driving mechanism 22 is supported by a load/unload mechanism 24 that moves the magnetic head 14 towards and away from a surface of the magnetic medium 12.

When a magnetic head is tested using this magnetic head tester, the magnetic head 14 that is the product being tested is attached to the head attaching mechanism 20, the magnetic head 14 is positioned at a predetermined position on the magnetic medium 12 by the head driving mechanism 22 and the load/unload mechanism 24, a signal is written on the magnetic medium 12 by a write control circuit 16, and the signal recorded on the magnetic medium 12 by the magnetic head 14 is then read using a level measuring circuit 18. A control unit 25 carries out an operation of driving the head driving mechanism 22 to feed the magnetic head 14 in pitch increments in the radial direction and detecting the output level of the read signal using the level measuring circuit 18.

However, a write head and a read head provided in the magnetic head 14 are disposed so as to be slightly offset in the track direction (the radial direction of the magnetic medium). The offset amount of the write head and the read head depends on the gap between the write head and the read head formed on a slider, and differs between individual products due to manufacturing fluctuations. Accordingly, the offset amount is measured using a magnetic head tester and magnetic heads are rejected when the offset amount exceeds a tolerance value (see Patent Document 1, for example).

Patent Document 1
Japanese Laid-Open Patent Publication No. H09-288811.

SUMMARY OF THE INVENTION

In a magnetic head tester, there are a variety of test items aside from the measurement of the offset amount of a write head and a read head. In such tests, there are large changes in the test results if the magnetic head 14 is displaced by even just a few tens of nm or so. Accordingly, to make it possible to accurately test whether a magnetic head is defective, it is necessary to correctly position the magnetic head 14 on the magnetic medium 12.

However, there are a variety of causes of displacements of the magnetic head 14, such as damage to the rotating mechanism part, loosening of attachment screws, displacements due to adhering dust, spindle vibrations, floor vibrations, thermal expansion or contraction of the magnetic medium and/or head suspension due to changes in the environmental temperature, and insufficient attachment force for the magnetic head attaching part. In magnetic head testers, apparatus rigidity has been increased and vibrations have been reduced to prevent the magnetic head 14 from becoming displaced during tests, but such measures are not sufficient in all cases.

On the other hand, since narrower track widths are being used for magnetic media to raise the magnetic recording density, the performance of magnetic head testers themselves are being subjected to demands for high positioning stability and high reproducibility for the set position. For this reason, it has been necessary to confirm that the magnetic head testers themselves for testing magnetic heads have the required accuracy and to carry out tests using only magnetic head testers with the required accuracy.

Since magnetic head write and read tests are carried out for every magnetic head, test operations are actually carried out using a plurality of magnetic head testers. Accordingly, to judge whether magnetic heads are defective or non-defective and provide non-defective magnetic heads, it is important to conduct tests having confirmed that the magnetic head testers have the required accuracy.

The present invention makes it possible to correctly evaluate the accuracy of a magnetic head, and by doing so provides a method of evaluating the positioning accuracy of a magnetic head tester that makes it possible to reliably provide non-defective magnetic heads.

To achieve the stated object, a method of evaluating positioning accuracy of a magnetic head tester according to the present invention tests a performance of a magnetic head by carrying out write and read operations on a magnetic medium using a magnetic head that is a tested product, and includes steps of:

acquiring a plurality of GAPS profiles by repeatedly carrying out a GAPS test that measures a GAP offset amount for a same magnetic head that has been attached to the magnetic head tester; and calculating a GAP offset fluctuation amount from the acquired plurality of GAPS profiles and setting a calculation result thereof as an index for evaluating a position reproducibility for the magnetic head.

Another method of evaluating positioning accuracy of a magnetic head tester according to the present invention tests a performance of a magnetic head by carrying out write and read operations on a magnetic medium using a magnetic head that is a tested product, and includes steps of: acquiring a plurality of GAPS profiles by repeatedly carrying out a GAPS test that measures a GAP offset amount for a same magnetic head that has been attached to the magnetic head tester; and calculating a write core width fluctuation amount from the acquired plurality of GAPS profiles and setting a calculation result thereof as an index for evaluating a linearity accuracy for the magnetic head tester.

Yet another method of evaluating positioning accuracy of a magnetic head tester according to the present invention tests a performance of a magnetic head by carrying out write and read operations on a magnetic medium using a magnetic head that is a tested product, and includes steps of: acquiring a GAPS profile by carrying out a GAPS test that measures a GAP offset amount for a same magnetic head that has been attached to the magnetic head tester; calculating a 50% position sensitivity in a vicinity of a position with 50% of a peak value in the acquired GAPS profile, moving the magnetic head to a 50% position in the GAPS profile and measuring an output level during an arbitrary time period at a moved-to position; calculating a 50% position fluctuation amount from a fluctuation amount in the output level and the 50% position sensitivity; and setting a calculation result thereof as an index of positional stability of the magnetic head. According to this method of evaluating, it is possible to correctly grasp how the magnetic head becomes displaced over time, so that it is possible to evaluate the positioning accuracy of a magnetic head tester more correctly.

Yet another method of evaluating positioning accuracy of a magnetic head tester tests a performance of a magnetic head by carrying out write and read operations on a magnetic medium using a magnetic head that is a tested product, and includes steps of: acquiring a GAPS profile by carrying out a GAPS test that measures a GAP offset amount for a same magnetic head that has been attached to the magnetic head tester; calculating a 50% position sensitivity in a vicinity of a position with 50% of a peak value in the acquired GAPS profile, moving the magnetic head to a 50% position in the GAPS profile, measuring an output level, moving the magnetic head to an arbitrary position, and moving the magnetic head back to the 50% position and remeasuring the output level; calculating a 50% position fluctuation amount from a fluctuation amount in the output level and the 50% position sensitivity; and setting a calculation result as an index of positional stability of the magnetic head. According to this method of evaluating, it is possible to correctly grasp and evaluate the positioning accuracy when a magnetic head moves for a seek operation.

The method of evaluating the positioning accuracy of a magnetic head tester according to the present invention uses a GAPS profile obtained when testing a magnetic head to evaluate the positioning accuracy of the magnetic head tester itself, so that it is possible to easily and correctly evaluate the positioning accuracy of a magnetic head tester. According to this method of evaluating, it is possible to evaluate the accuracy of a magnetic head tester at any time, and so it is possible to test a magnetic head while monitoring whether the magnetic head tester itself can properly carry out tests on a magnetic head. This means that accurate and highly reliable tests of a magnetic head can be carried out.

BRIEF DESCRIPTION OF THE DRAWINGS

The aforementioned and other objects and advantages of the present invention will become apparent to those skilled in the art upon reading and understanding the following detailed description with reference to the accompanying drawings.

In the drawings.

DETAILED DESCRIPTION OF THE EMBODIMENTS

A method of evaluating positioning accuracy of a magnetic head tester according to the present invention is characterized by using measurement data produced when testing the performance of a magnetic head using a magnetic head tester as data for evaluating the positioning accuracy of the magnetic head tester itself. That is, in a magnetic head tester, tests are carried out to measure the offset (GAP offset) between the write head and the read head as one test item for a product, and the magnetic head tester is evaluated by using measurement data (a GAPS profile), generated when measuring the GAP offset, as evaluation data for evaluating the accuracy of the magnetic head tester.

Acquisition of a GAPS Profile

Figure 1:
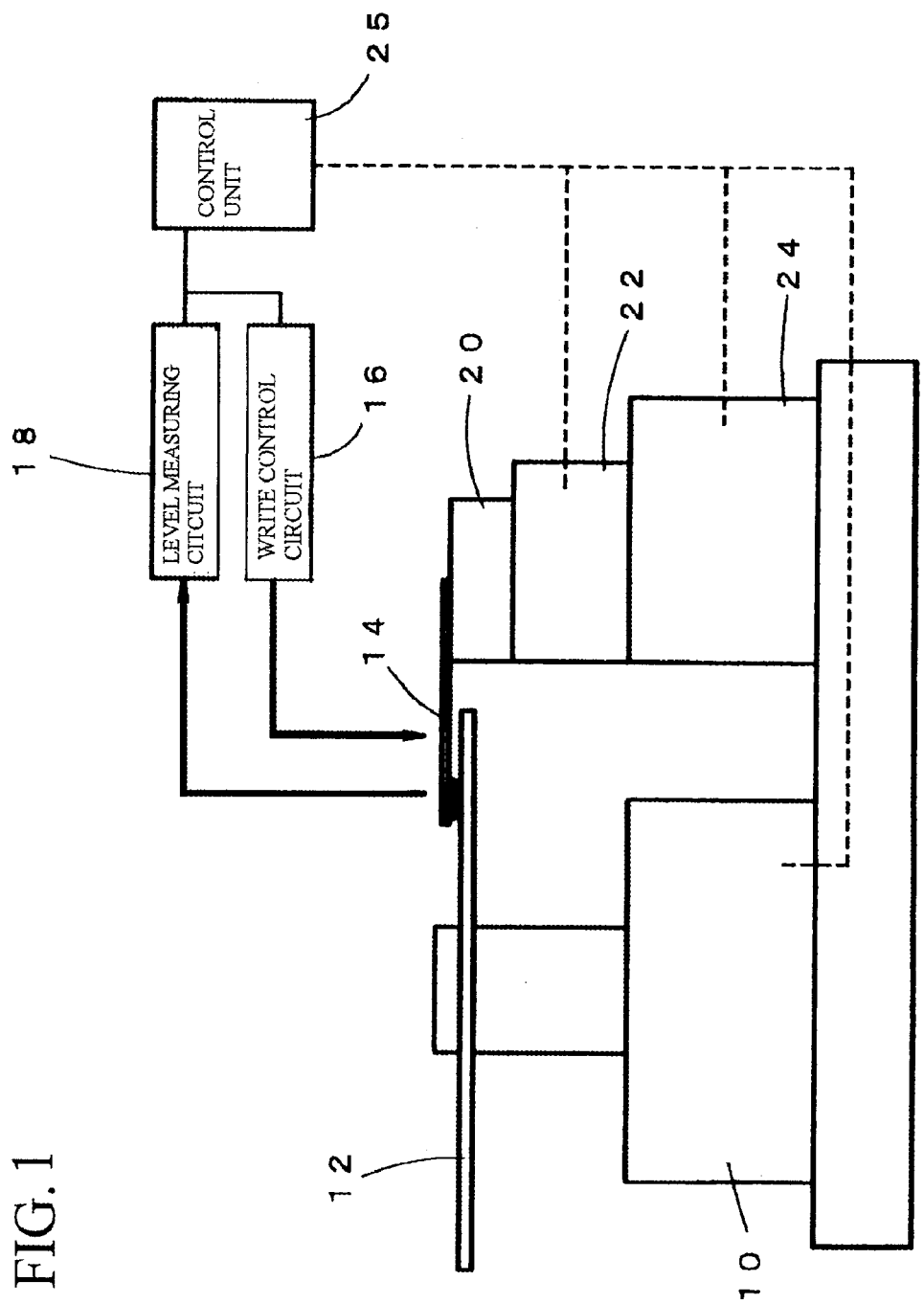
FIG. 1 is a block diagram schematically showing the construction of a magnetic head tester that evaluates accuracy using a method of evaluating the positioning accuracy of a magnetic head tester according to the present invention.
Figure 2:
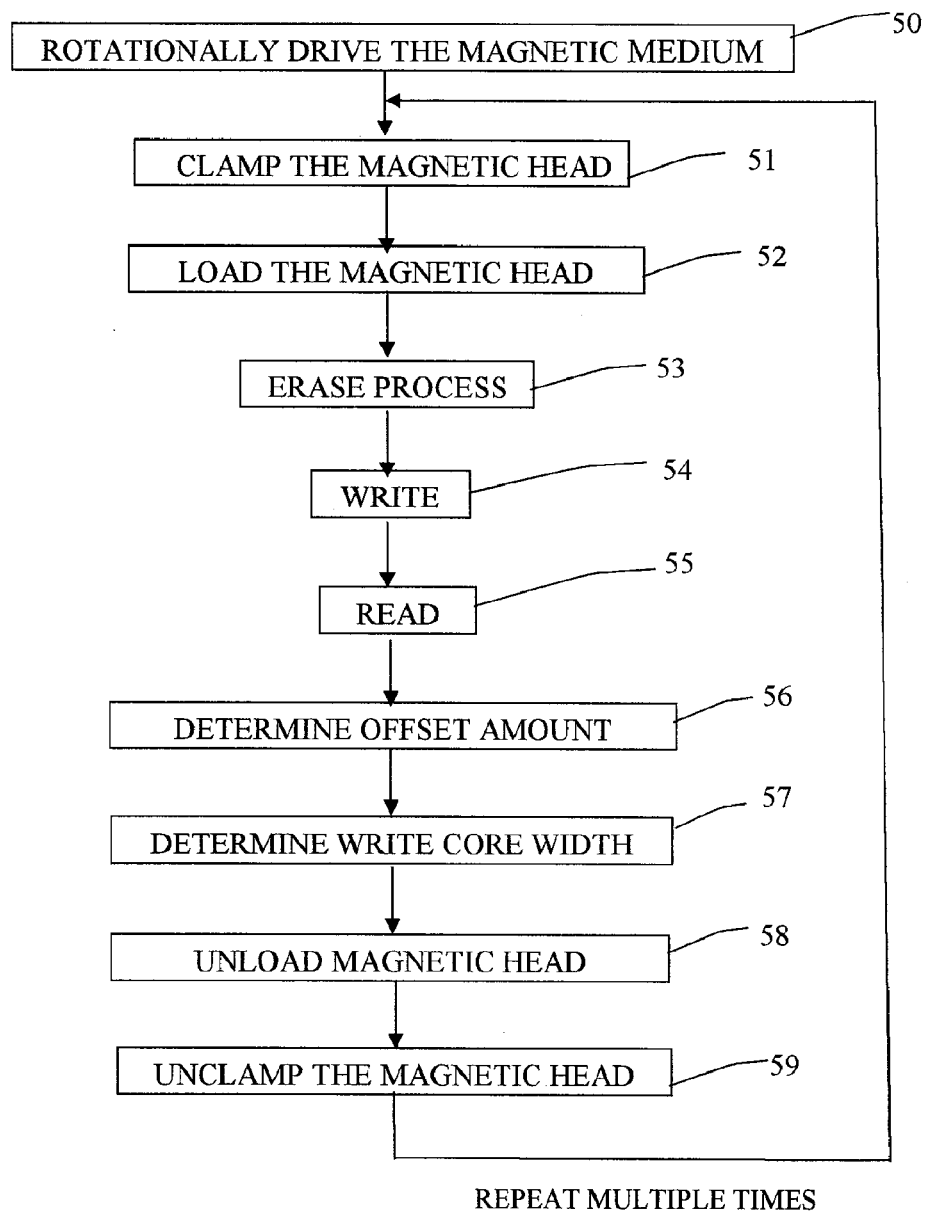
FIG. 2 is a flowchart showing a measuring process of the method of evaluating the positioning accuracy of a magnetic head tester according to the present invention.

FIG. 2 shows a process for acquiring a GAPS profile for measuring the positioning accuracy of a magnetic head tester according to the present invention.

That is, first the magnetic disc driving mechanism 10 is driven so that the magnetic medium 12 starts to rotate (step 50), the magnetic head 14 is attached to the head attaching mechanism 20 (step 51), and the magnetic head 14 is loaded at the test position using the load/unload mechanism 24 (step 52).

Next, with the position at which the magnetic head 14 is loaded as the starting point, an erase process is carried out using the head driving mechanism 22 to erase a region from 5 μm inside the starting point to 5 μm outside the starting point (step 53).

Next, a signal of an arbitrary frequency is written at the loaded position (starting point) using the write control circuit 16 (step 54). Next, the magnetic head 14 is moved with a pitch of 0.02 μm using the head driving mechanism 22 from the inner side towards the outer side, and the output level of each track from the read head is read using the level measuring circuit 18 (step 55). By doing so, it is possible to obtain a single GAPS profile.

Next, a GAP offset value is determined from a position at which the output level of the obtained GAPS profile reaches a peak value (step 56). A write core width is also determined from a distance in the obtained GAPS profile between positions on the inner side and the outer side at which the output level is 50% of the peak value (step 57).

By doing so, after an offset value and a write core width have been obtained from the first GAPS profile, the process proceeds to a test that obtains a second GAPS profile.

When obtaining the second GAPS profile, the magnetic head 14 is temporarily unloaded from the loading position (step 58), and after the magnetic head 14 has been returned to a withdrawn position from a position above the magnetic medium 12, the magnetic head 14 is unclamped from the head attaching mechanism 20 (step 59).

Next, the magnetic head 14 used in the above test is attached to the head attaching mechanism 20 once more by clamping (step 51), the magnetic head 14 is loaded to a predetermined position above the magnetic medium 12 (step 52), and a GAPS profile is obtained by carrying out steps 53 to 57 in the same way as above. It should be noted that steps 53 to 57 correspond to a GAPS test for detecting the GAP offset value of a magnetic head.

In this way, the magnetic head 14 is repeatedly clamped to the head attaching mechanism 20 and a GAPS profile is acquired each time. The acquired number of GAPS profiles may be set at a sufficiently high number to estimate the positioning accuracy of the magnetic head tester. In the present embodiment, steps 51 to 59 are repeated 10 times and 10 GAPS profiles are acquired. It should be noted that these measurements can be automatically carried out by controlling the head driving mechanism 22, the load/unload mechanism 24 and the write control circuit 16, and the level measuring circuit 18 and the like using the control unit 25.

Figure 3:
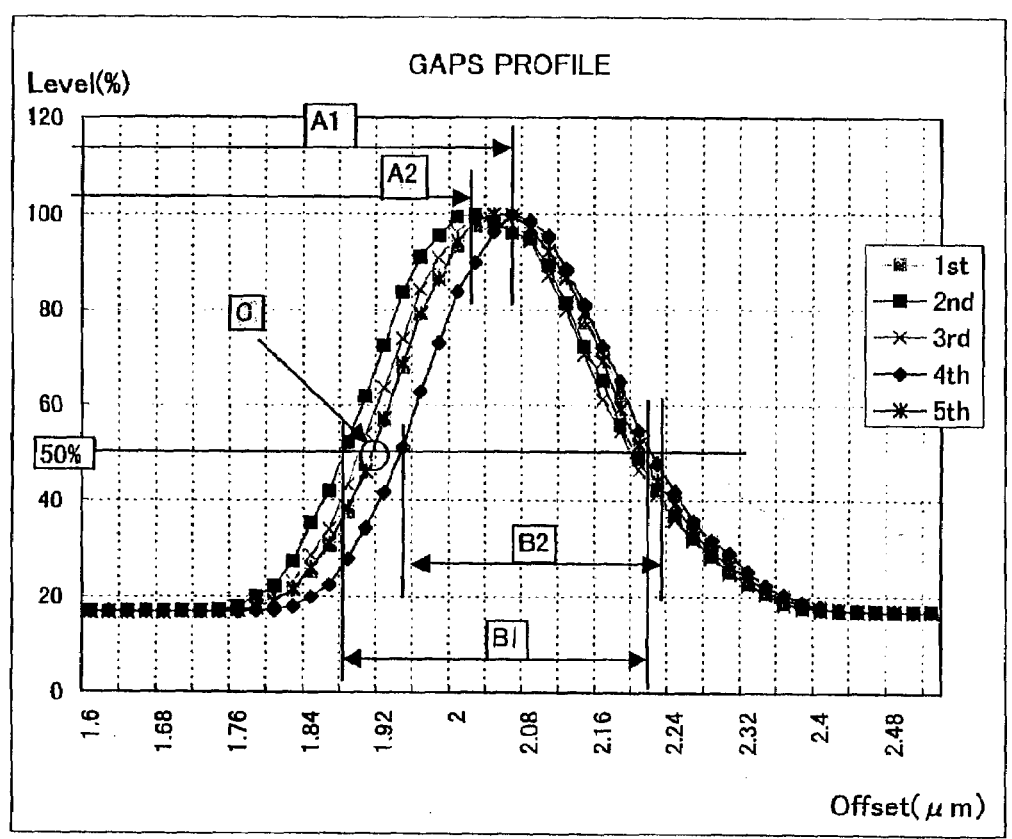
FIG. 3 is a diagram showing examples of GAPS profiles obtained by a measuring process according to the method of evaluating the positioning accuracy of a magnetic head tester according to the present invention.

FIG. 3 shows examples of GAPS profile obtained by the process shown in FIG. 2. In FIG. 3, for ease of explanation, GAPS profiles obtained for the first to fifth measurements are shown.

Regarding the Position Reproducibility of the Magnetic Head

If the positioning accuracy of the magnetic head tester were perfect, the GAPS profile acquired in each of the measurements would have a matching pattern, but in reality, as shown in FIG. 3, the GAPS profile of each measurement is obtained as slightly displaced data.

In FIG. 3, out of the obtained GAPS profiles, A1 shows the maximum value of the GAP offset value and A2 the minimum GAP offset value. That is, it is possible to estimate a fluctuation amount of the GAP offset of the magnetic head tester as shown below from the measurement data of the GAPS profiles shown in FIG. 3.

GAP offset fluctuation amount=GAP offset maximum value (A1)−GAP offset minimum value (A2)

Since the same tester and the same magnetic head are used for these measurements, the GAP offset value should be obtained as a fixed value, but the fluctuations in the GAP offset value as shown in FIG. 3 show that there is some causes of displacement for the magnetic head tester itself. Such displacements are thought to be caused by loosening of screws, spindle fluctuations, differences in thermal expansion between the magnetic medium and the head suspension, displacements of the magnetic head attaching part, and the like.

That is, by looking at the GAP offset fluctuation amount obtained from the measurement data of GAPS profiles, it is possible to evaluate the position (setting position) reproducibility of the magnetic head tester itself. In addition, since it is known that the GAP offset fluctuation amount needs to be a predetermined value or below for testing to be carried out with a desired accuracy, when testing a magnetic head, by confirming that positioning accuracy of a magnetic head tester is no greater than the required GAP offset fluctuation amount, it is possible to carry out proper tests.

Regarding the Linearity Accuracy of the Moved Amount

The write core width can be found as the difference (gap) between the inner position and the outer position where the output level of the GAPS profile reaches 50% of the peak value. In FIG. 3, out of the acquired GAPS profiles, B1 shows the maximum value of the write core width and B2 shows the minimum value of the write core width. Accordingly, the fluctuation amount of the write core width of the present magnetic head tester can be estimated as shown below.

write core width fluctuation amount=write core width maximum value (B1)−write core width minimum value (B2)

It is thought that the write core width fluctuates due to displacement that occurs when the output level is measured by the read head and/or due to non-linearity of the movement in pitch increments when the head driving mechanism 22 is pitch fed. That is, when the magnetic head is moved and the output level is measured, if the movement is not linear due to reasons such as the head driving mechanism 22 being damaged, the write core width will fluctuate. Accordingly, it is possible to estimate the linearity accuracy of the movement amount of the magnetic head tester from the fluctuation amount of the write core width.

The linearity of this movement amount is also an index for evaluating the positioning accuracy of the magnetic head tester. That is, by confirming that the write core width fluctuation amount found from the GAPS profiles acquired in the measurement tests is no greater than a predetermined value, it is possible to ensure that the test results produced by a magnetic head tester for a magnetic head are reliable.

Regarding Positional Stability

The expression "positional stability" refers to the accuracy with which positioning of the magnetic head can be stably carried out without displacements from a predetermined position when the magnetic head has been moved to the predetermined position.

In the present embodiment, the positional stability of a magnetic head was evaluated by focusing on a linear segment at a position where the output level of the GAPS profile obtained from the above measurements is at 50% of the peak level, and converting the change amount of the output level at this position to a position fluctuation amount.

As shown by the point C in FIG. 3, the output level fluctuates in a linear manner in a vicinity of a position where the output level is 50% of the peak value in the GAPS profile. The sensitivity of these parts where the output level fluctuates linearly (the 50% position sensitivity) is defined by the following equation.

50% position sensitivity=(track position Y2−track position Y1)/(output level X2−output level X1)

Figure 4:
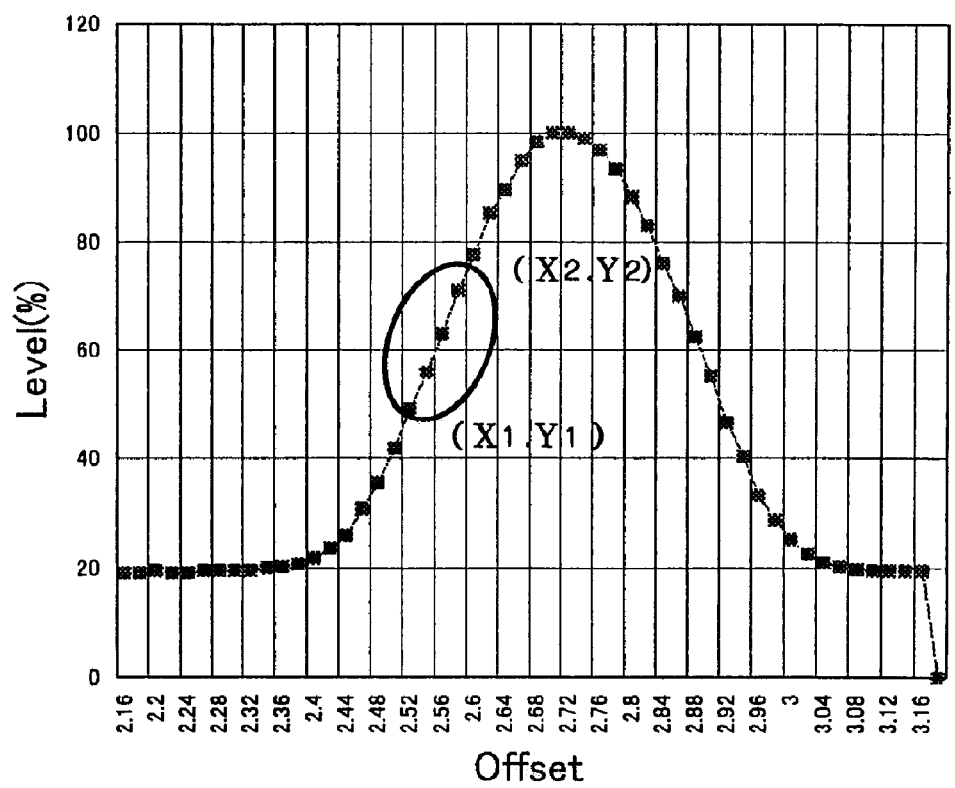
FIG. 4 is a diagram useful in explaining the method of calculating 50% position sensitivity.

FIG. 4 shows one example calculation of the 50% position sensitivity in the GAPS profile. The 50% position sensitivity is calculated for a suitable region in the vicinity of the C point. In the example GAPS profile illustrated in FIG. 4, X1=186, X2=295, Y1=2.518, and Y2=2.598, so that the 50% position sensitivity=(2.598−2.518)/(295−186)/1000000 (μm/V). It should be noted that the 50% position sensitivity is smaller the larger the inclination of the GAPS profile, and larger the smaller the inclination of the GAPS profile.

The measurement of the positional stability is carried out by positioning the magnetic head at the position (C point) in the GAPS profile where the output level reaches 50% or thereabouts of the peak value and measuring the output level while keeping the magnetic head at this position for a predetermined time. That is, since it is possible to calculate, the GAPS profile, the positional sensitivity at a position where the output level is 50% or thereabouts of the peak, by measuring how the output level fluctuates, it is possible to convert the fluctuation value in the output level into a displacement amount of the magnetic head. The positional fluctuation amount (50% position fluctuation amount) of the magnetic head can be found from the fluctuation value of the output level using the following equation.

50% position fluctuation amount=(maximum output level−minimum output level)×50% position sensitivity It should be noted that the maximum output level in this equation is the maximum output level out of output levels measured during a predetermined period when the magnetic head has been placed at the C point and the minimum output level is a minimum output level measured during this predetermined period.

In the above equation, if the difference between the maximum output level and the minimum output level is small, there is little displacement of the magnetic head and the magnetic head is properly held at the predetermined position, which means that the magnetic head tester is capable of highly precise tests. On the other hand, if the difference between the maximum output level and the minimum output level is large, the magnetic head is susceptible to becoming displaced from the predetermined position, which means that the test accuracy of the magnetic head tester is low. In addition, when the 50% position sensitivity is high, the accuracy of the magnetic head tester is susceptible to falling due to displacements of the magnetic head, while when the 50% position sensitivity is low, the accuracy of the magnetic head tester is not susceptible to falling due to displacements of the magnetic head.

Figure 5:
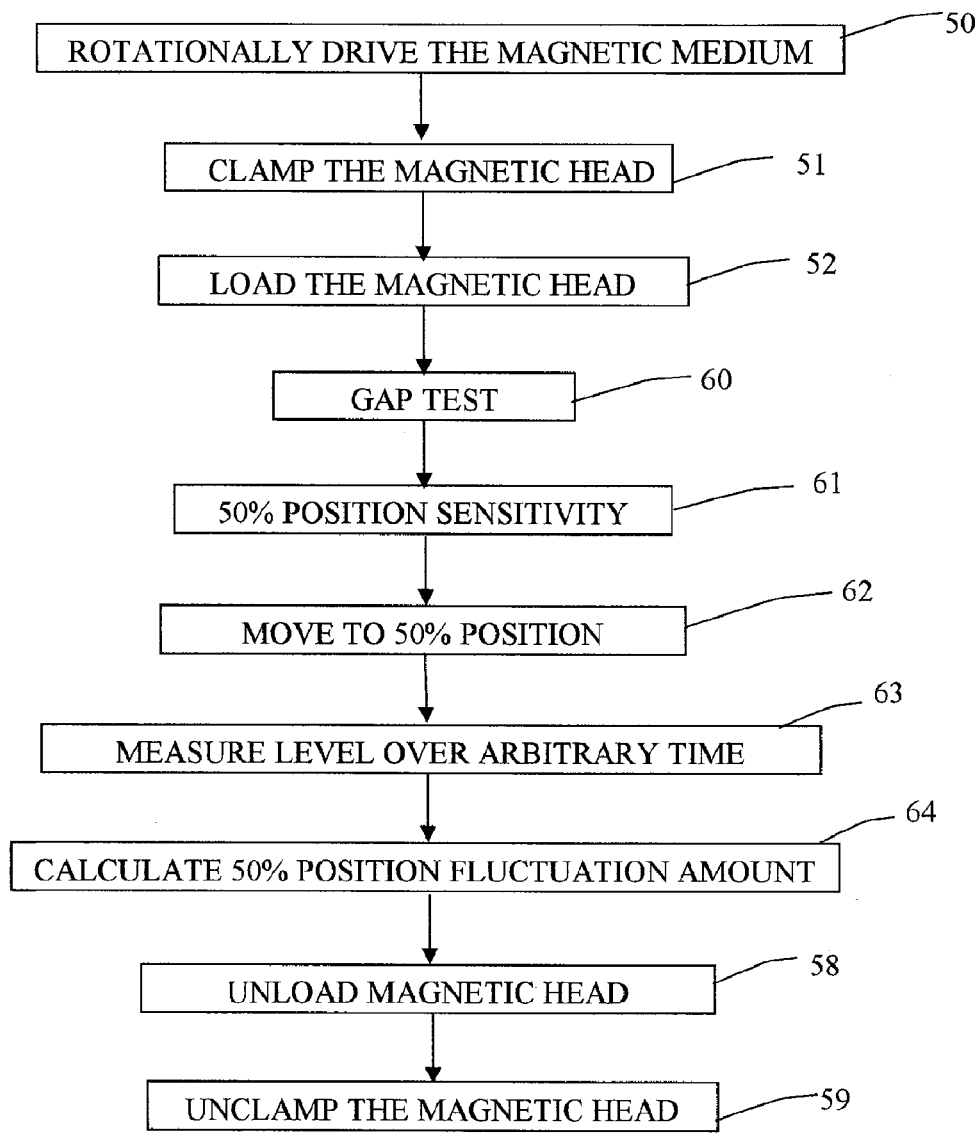
FIG. 5 is a flowchart showing the process for measuring positional stability.
Figure 6:
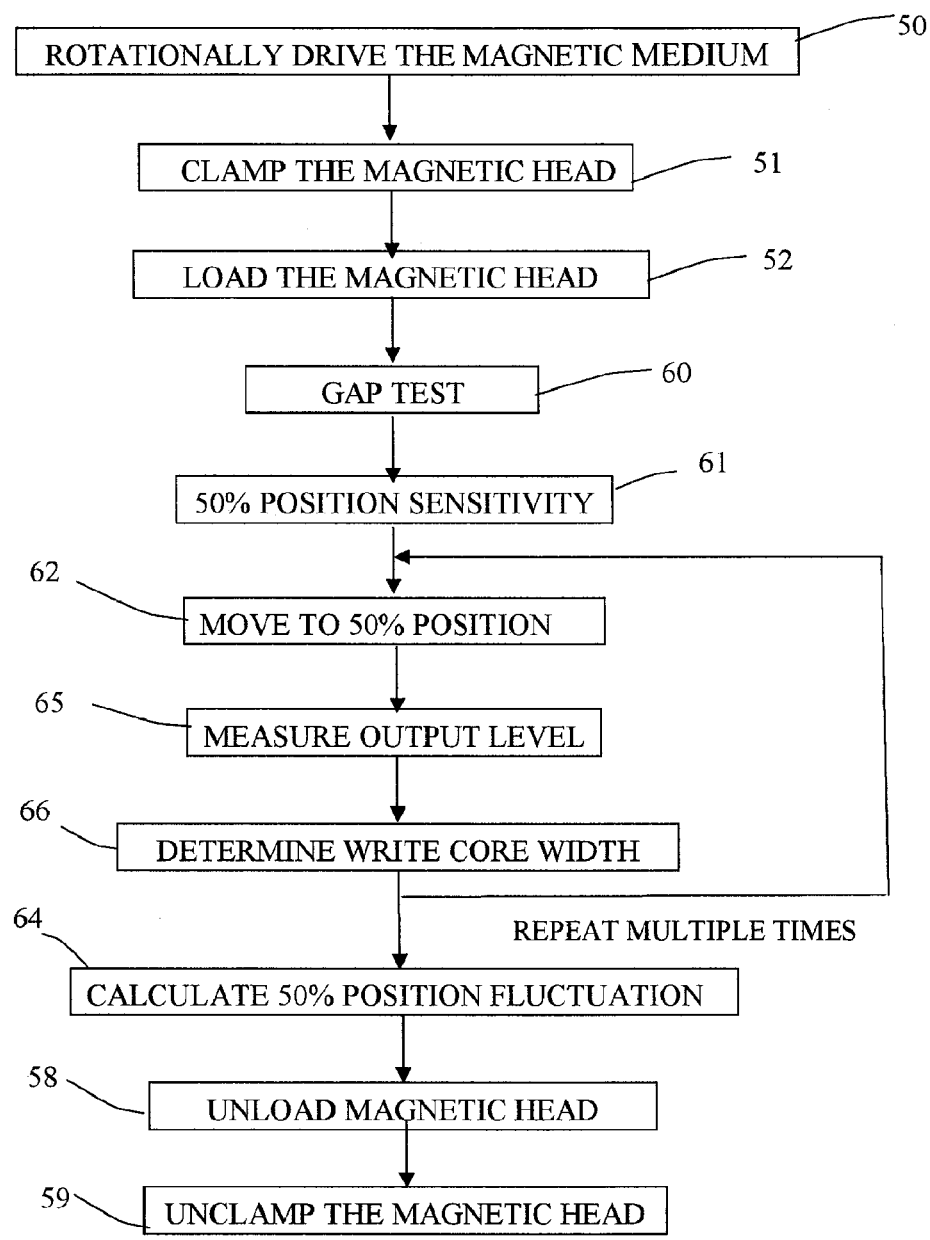
FIG. 6 is a flowchart showing another process for measuring positional stability.

FIGS. 5 and 6 show a process of measuring the positional stability of the magnetic head from level fluctuations at the 50% level position in a GAPS profile. FIG. 5 shows a normal mode measuring method for measuring the positional stability of the magnetic head.

That is, first the magnetic disc driving mechanism 10 is driven so that the magnetic medium 12 starts to rotate (step 50), the magnetic head 14 is attached to the head attaching mechanism 20 (step 51), and the magnetic head 14 is loaded at the test position (step 52).

Next, a GAPS test is carried out (step 60), and the 50% position sensitivity is calculated (step 61). It should be noted that the expression "GAPS test" refers to the process in steps 53 to 57 in FIG. 2. By carrying out this GAPS test, a GAPS profile is acquired. In addition, it is possible to calculate the 50% position sensitivity from the GAPS profile.

Next, the magnetic head 14 is moved to a point (the C point) where the output level reaches 50% in the GAPS profile (step 62). After being moved to this C point, the magnetic head 14 is stopped at this position for twenty seconds, for example, and the output level is measured by the level measuring circuit 18 at two-second intervals, for example during this stopped period (step 63). Next, the fluctuation amount at the 50% position of the magnetic head is calculated from the output level of the magnetic head 14 obtained in step 63 (step 64). This calculation result of step 64 expresses the positional stability of the magnetic head tester.

FIG. 6 shows a process for measuring the positional stability of the magnetic head in accordance with seek mode for the magnetic disc. The characteristic steps in this measuring process are calculating the 50% position sensitivity from the GAPS profile (step 61), moving the magnetic head 14 to the 50% position (step 62), measuring the output level at this position (step 65), then moving the magnetic head 14 to an arbitrary position (step 66), moving the magnetic head 14 back to the 50% position (step 62), and measuring the output level once again.

That is, in steps 62, 65, and 66, the operation that moves the magnetic head 14 from the 50% position to an arbitrary position corresponds to a seek operation of the magnetic head 14, so that it is measured whether the magnetic head 14 can properly return to the 50% position when a seek operation is carried out.

In this way, the magnetic head 14 is moved, the output level is measured every time the magnetic head 14 has been moved, and the positional fluctuation amount for seek operations of the magnetic head is calculated from the maximum value and the minimum value of the output level (step 64). That is, the calculation result of step 64 shows the accuracy achieved when a seek operation is carried out using a magnetic head tester to test the characteristics of the magnetic head.

According to the measuring processes shown in FIGS. 5 and 6, it is possible to evaluate the accuracy with which a magnetic head tester can stably position a magnetic head at a predetermined position without displacement when the magnetic head has been moved to the predetermined position.

It should be noted that the embodiment described above describes a method for evaluating displacement when the magnetic head 14 has been positioned at a specified position on a magnetic medium 12. This evaluation method can be adopted regardless of the position at which the magnetic head 14 is located on the magnetic medium 12, and by changing the positioning location of the magnetic head 14 on the magnetic medium 12, it is possible to evaluate the accuracy at a suitable position.

As described above, by using this method of evaluating positioning accuracy for a magnetic head tester according to the present invention, it is possible to correctly evaluate the measurement accuracy of a magnetic head tester, with it being possible to use a magnetic head tester based on the evaluation result thereof. With the method according to the present invention, since it is possible to use a GAPS profile actually acquired by a magnetic head tester as evaluation data, it is possible to carry out evaluation in a state that includes the causes of mechanical errors and the like that are involved in a GAPS test, so that this method can be favorably used to evaluate accuracy relating to tests of a magnetic head.

Also, since it is possible to use a test operation that tests a magnetic head using a magnetic head tester to evaluate the magnetic head tester itself, there is the advantage that it is easy to evaluate and monitor the magnetic head tester at any time, such as at the start or during a test.

What is claimed is:

1. A method of evaluating positioning accuracy of a magnetic head tester that tests a performance of a magnetic head by carrying out write and read operations on a magnetic medium using a magnetic head that is a tested product, comprising steps of:

acquiring a plurality of GAPS profiles by repeatedly carrying out a GAPS test that measures a GAP offset amount for a same magnetic head that has been attached to the magnetic head tester; and calculating a GAP offset fluctuation amount from the acquired plurality of GAPS profiles and setting a calculation result thereof as an index for evaluating a position reproducibility for the magnetic head, wherein the GAP offset fluctuation amount is equal to a GAP offset maximum value minus a GAP offset minimum value.

2. A method of evaluating positioning accuracy of a magnetic head tester that tests a performance of a magnetic head by carrying out write and read operations on a magnetic medium using a magnetic head that is a tested product, comprising steps of:

acquiring a plurality of GAPS profiles by repeatedly carrying out a GAPS test that measures a GAP offset amount for a same magnetic head that has been attached to the magnetic head tester; and calculating a write core width fluctuation amount from the acquired plurality of GAPS profiles and setting a calculation result thereof as an index for evaluating a linearity accuracy for the magnetic head tester, wherein the write core width fluctuation amount is equal to a write core width maximum value minus a write core width minimum value.

3. A method of evaluating positioning accuracy of a magnetic head tester that tests a performance of a magnetic head by carrying out write and read operations on a magnetic medium using a magnetic head that is a tested product, comprising steps of:

acquiring a GAPS profile by carrying out a GAPS test that measures a GAP offset amount for a same magnetic head that has been attached to the magnetic head tester;

calculating a 50% position sensitivity in a vicinity of a position with 50% of a peak value in the acquired GAPS profile, moving the magnetic head to a 50% position in the GAPS profile and measuring an output level during an arbitrary time period at a moved-to position;

calculating a 50% position fluctuation amount from a fluctuation amount in the output level and the 50% position sensitivity; and setting a calculation result as an index of positional stability of the magnetic head, wherein the 50% position sensitivity is equal to (a second track position minus a first track position) divided by (a second output level minus a first output level).

4. A method of evaluating positioning accuracy of a magnetic head tester that tests a performance of a magnetic head by carrying out write and read operations on a magnetic medium using a magnetic head that is a tested product, comprising steps of:

acquiring a GAPS profile by carrying out a GAPS test that measures a GAP offset amount for a same magnetic head that has been attached to the magnetic head tester;

calculating a 50% position sensitivity in a vicinity of a position with 50% of a peak value in the acquired GAPS profile, moving the magnetic head to a 50% position in the GAPS profile, measuring an output level, moving the magnetic head to an arbitrary position, and moving the magnetic had back to the 50% position and remeasuring the output level;

calculating a 50% position fluctuation amount from a fluctuation amount in the output level and the 50% position sensitivity; and setting a calculation result as an index of positional stability of the magnetic head, wherein the 50% position fluctuation amount is equal to (a maximum output level minus a minimum output level) times the 50% position sensitivity.

* * * * *